3,146,146
USE OF IONIZING RADIATION TO IMPROVE POLYMER-METAL LAMINATES
Herbert R. Anderson, Jr., Bartlesville, Okla., assignor to Phillips Petroleum Company, a corporation of Delaware
No Drawing. Filed July 11, 1961, Ser. No. 123,111
13 Claims. (Cl. 156—272)

This invention relates to increasing the strength of the bond of polymer-metal laminates.

Methods forming strong bonds between polymers and metals are of increasing interest in equipment manufacture, insulated cable construction, and the like. In one instance, laminates are formed merely by contacting the one material with the other, usually under heat and pressure. However, the bonds obtained by such procedures are relatively weak, and will separate under stress.

An alternative solution has been to form the laminates by bonding with special bonding agents. However, the presence of an intermediate layer of bonding agent is not always acceptable.

Moreover, polyolefins, particularly polyethylene, are bonded to other materials with some difficulty by customary heat and pressure alone.

It is an object of this invention to provide superior laminates of metals and solid polymers.

Another object is to provide laminates of metal and solid polymers in which the bond strength has been increased by ionizing radiation.

Still another object is to provide an improved process for the manufacture of laminates of metal and solid polymers employing ionizing radiation.

These and other objects will be apparent to those skilled in the art without departing from the spirit or scope thereof.

In accordance with the present invention, samples of solid polymers such as trans- and cis-polymers of conjugated dienes, polyethylene, polypropylene and copolymers of ethylene with 1-olefins, are placed in pressure contact with metal surfaces. Mixtures of the foregoing polymers are also adapted to the method of this invention. The polymer component is heated above its crystalline melting point, after which it is subjected to ionizing radiation, to obtain a bond superior to conventional methods of adhesion, for forming polymer to metal bonds.

The metals which are utilized within the scope of this invention are any metals of construction with which it is desired to form a polymer-metal laminate. I have found that the process is particularly useful in bonding aluminum and brass to polymers, or bonding those metals to themselves or to each other by use of an intermediate layer of polymer.

The solid polymers which are employed within the scope of this invention are prepared by a number of well known methods.

Trans-polymers of conjugated dienes are prepared by means of certain catalyst systems to produce polymers high in 1,4-structures of the trans configuration. Among these polymers are trans-poly(1,3-butadiene), trans-poly(2-methyl-1,3-butadiene), trans-poly(2-methyl-1,3-pentadiene), and the like.

Cis-polymers of conjugated dienes are prepared by means of certain catalyst systems to produce polymers high in 1,4-structures of the cis-configuration. Among these polymers are cis-poly(1,3-butadiene), cis-poly(2-methyl-1,3-butadiene), cis-poly(2-methyl-1,3-pentadiene), and the like.

The cis- and trans-polymers of conjugated dienes can be prepared by methods known in the art. Suitable catalyst system includes the well known organometal catalysts which will yield the desired stereo-specific polymers.

Generally, any polyethylene can be used, although the polyethylenes of high crystallinity are preferred. Polyethylene prepared by use of chromium containing catalysts by organometal catalyst systems, such as trialkylaluminum and titanium tetrachloride and polyethylenes prepared under the so called "high-pressure process" can be utilized in the process of this invention. As indicated, the invention is particularly applicable to polymers of ethylene which have a specific gravity of at least 0.94 at 20° C. and preferably 0.96 or higher and a crystallinity of at least 70 percent, and more preferably at least 80 percent at 25° C.

Solid polypropylene suitable for use can be prepared by various methods including the polymerization of propylene in the presence of an organo-metallic type catalyst such as a mixture of an organoaluminum and a halide of titanium. The copolymers which are utilized within the scope of this invention are those copolymers of ethylene with 1-olefins containing from 3 to 8 carbon atoms, and wherein ethylene comprises a major portion of the polymer. Preferably, the copolymers contain at least 80 percent ethylene and it is even more preferred to employ copolymers containing at least 90 percent ethylene. Some examples of 1-olefins which can be copolymerized with ethylene in the manufacture of these copolymers are propylene, 1-butene, 4-methyl-1-pentene, 1-hexene and 1-octene.

It is understood that the polymer compositions employed can include compounding or curing ingredients, stabilizers, antioxidants, fillers, pigments, and the like.

The crystalline melting point is different, of course, for different polymers. The crystalline melting point for trans-polybutadiene is approximately 180° F., all other polymers specified above having melting points above this level. The homopolymers of ethylene and copolymers of ethylene described above will usually have melting points within the range of approximately 200 to 260° F. It is therefore suggested that the temperature range during irradiation be from 175 to 500° F. The temperature should be maintained below that at which undue thermal or oxidative degradation of the polymer occurs. If desired, an inert atmosphere can be employed to prevent oxidative degradation, or the polymer can be compounded with known antioxidants to retard degradation of this type.

Hydrocarbons, water and similar inert substances can be employed as the inert atmosphere, either in the liquid or vapor form.

In the process of this invention, the improvement in adhesion is effected by irradiating one of the above-described polymers while it is molten and while it is in contact with the metal to which it is to be adhered, with high energy ionizing radiation, such as gamma rays, electrons, protons and alpha particles. The preferred form of irradiation is gamma rays. When gamma rays are employed, the dose rate can be within the range between $1 \times 10^3$ and $1 \times 10^{12}$ roentgens equivalent physical (rep) per hour for a sufficient length of time so that the total dosage received by the polymer is within the range between $1 \times 10^5$ and $1 \times 10^{10}$ rep. The total dosage necessary to form superior laminates is a function of radiation sensitivity of the particular polymer undergoing irradiation, and can be determined empirically.

Any suitable source of gamma rays can be used, including such sources as spent fuel elements from nuclear reactors, radioactive isotopes, cathode tubes, and linear accelerators employing targets such as tungsten for the conversion of electrons to gamma rays.

If electrons, protons or alpha particles are employed, the polymer is subjected to these particles having energies of from 1 million electron volts (m.e.v.) to 1 billion electron volts (b.e.v.) and can be supplied from such sources as linear accelerators, Van de Graaff generators, betatrons, cyclotrons, and the like. Beam currents from these sources will range from 0.1 to 1000 microamperes, and the irradiation time using such beams will vary from 0.5 to 60 minutes.

In any event, the high energy particles must have sufficient energy to penetrate the particular metal being bonded. For example, a ¾ inch thick piece of aluminum requires an energy of 6 million electron volts to be fully penetrated.

It is advantageous that the metal to which the polymer is to be applied and adhered thereto be clean. Conventional cleaning techniques for the metal can be employed, including such agents as sulfuric acid, dichromate solutions, nitric acid, ammonium persulfate solutions, and the like. Conventional degreasing agents can be used before cleaning as required.

EXAMPLE I

A polybutadiene rubber having a trans-1,4 content of about 90 percent, a Mooney viscosity (ML–4 at 213° F.) of about 20, an inherent viscosity of 1.65, and a melting point of 183° F., was prepared by solution polymerization of butadiene in n-hexane diluent at 122° F., using a catalyst system comprising lithium aluminum hydride and titanium tetraiodide. The polymer was recovered from the solution by conventional means, and contained 0.5 weight percent of an antioxidant (2,2′-methylene-bis(4-methyl-6-tertiary butyl phenol)).

Strips of aluminum and brass were treated as follows to provide clean surfaces for adhesion. The aluminum strips were immersed in 10 percent by weight aqueous sulfuric acid for a few minutes. The brass strips were immersed in a 10 percent by weight aqueous solution of ammonium persulfate for 30 minutes. To make up each test sample, a polybutadiene slab was spaced between two of the aluminum strips to provide a square inch lap joint. A similar procedure was followed for the brass strips.

One set of each metal laminate was kept as a control, while the others were subjected to the method of this invention. The control samples were heated for one hour at from 350–370° F. only.

A temperature of 350–370° F. was also applied to the test samples for a period of time sufficient to assure that the crystalline melting point had been attained. Irradiation with gamma rays followed for about one hour, provided by a linear accelerator at full power (360 pulses per second), to produce a 3 kilowatt beam of electrons on a tungsten target which converted the electrons to gamma rays. The total dosage received by each sample was approximately $5 \times 10^7$ roentgens equivalent physical (rep).

The samples were then pulled on an Instron tester at a rate of 0.02 inch per minute until they parted. The results are tabulated below in Table I.

EXAMPLE II

A polybutadiene rubber having a cis-1,4 content of 95.5%, a Mooney viscosity (ML–4 at 212° F.) of about 42.3, an inherent viscosity of 2.49, and an ash content of 0.53%, was prepared by solution polymerization of butadiene in toluene diluent, using a catalyst comprising triisobutyl aluminum, iodine, and titanium tetrachloride at approximately 40° F. The polymer was recovered from the solution by conventional means. A number of strips of the two metals and the cis-polybutadiene were formed into test samples as previously described. Sample heating, sample irradiation, and tensile testing followed. Again the results are tabulated below in Table I.

EXAMPLE III

A batch of polyethylene was prepared according to the method of Hogan and Banks using a catalyst comprising chromium oxide supported on silica-alumina, cyclohexane as diluent, and a reaction temperature of about 285° F., and a pressure of about 500 p.s.i.g. The polymer had a density of about 0.960.

A number of strips of the two metals and the polyethylene were formed into test samples, as previously described. Sample heating, sample irradiation, and tensile testing followed. Again, the results are tabulated below in Table I.

EXAMPLE IV

A batch of commercial polypropylene was prepared in the presence of an organometal catalyst, having the following physical properties: density, 0.9066 gm./cc.; melting point, 330° F.; melt index at 230° F., 3.0; tensile, 5132 p.s.i.; percent elongation, 15; flexural modulus, 226,000 p.s.i.; Shore D Hardness, 76; and brittleness temperature, +64° F.

The test samples were prepared, treated, and tested as described in connection with Example I. The results are tabulated below in Table I.

EXAMPLE V

A batch of ethylene-butene copolymers was prepared by polymerizing a mixture of ethylene and butene-1 according to the aforedescribed method of Hogan and Banks. The physical properties of the copolymer were as follows: density, 0.950 gram per cc.; melting point, 266° F.; melt index at 230° F., 4.0; tensile, 3800 p.s.i.; percent elongation, 30; flexural modulus, 115,000 p.s.i.; Shore D Hardness, 67; brittleness temperature, −160° F.

The test samples were prepared, treated, and tested, as described in connection with Example I, with the copolymer strips being substituted for the other polymers. The results are also tabulated in Table I.

*Table I*

| Polymer | Bond strength, p.s.i. | | | |
| --- | --- | --- | --- | --- |
| | Aluminum | | Brass | |
| | Without irradiation | With Irradiation [a] | Without irradiation | With irradiation [a] |
| trans-Polybutadiene | 420 | 820 | 540 | 800 |
| cis-Polybutadiene | 5 | 40 | 5 | 35 |
| High density polyethylene | 450 | 1,030 | 260 | 340 |
| Polypropylene | 40 | 90 | | |
| Ethylene/butene copolymer | 160 | 540 | 120 | 670 |

[a] One hour under linear accelerator for total dosage of $5 \times 10^7$ rep.

It is readily apparent from the above data, that the present process significantly increases bond strength of the laminates of the tested metals and solid polymers in a range from 31 to 800 percent.

While the invention has been described in conjunction with preferred embodiments, it should be apparent that it is not limited thereto. It is to be understood that many variations and modifications are within the scope of the invention.

I claim:

1. A method of bonding metal and a polymer selected from the group consisting of trans-poly(1,3-butadiene), trans-poly(2-methyl-1,3-butadiene), trans-poly(2-methyl-1,3-pentadiene), cis-poly(1,3-butadiene), cis-poly(2-methyl - 1,3 - butadiene), cis - poly(2 - methyl - 1,3 - pentadiene), polyethylene, polypropylene, ethylene-butene copolymer, ethylene-propylene copolymer, ethylene-4-methyl-1-pentene copolymer, ethylene-1-hexene copolymer, and ethylene-1-octene copolymer which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

2. The method according to claim 1 wherein said metal is selected from the group consisting of aluminum and brass.

3. The method of claim 1 wherein said high energy radiation is selected from the group consisting of gamma rays, electrons, protons, and alpha particles.

4. A method of bonding aluminum to trans-polybutadiene which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

5. A method of bonding aluminum to cis-polybutadiene which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

6. A method of bonding aluminum to high density polyethylene which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

7. A method of bonding aluminum to high density polypropylene which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

8. A method of bonding aluminum to a copolymer of ethylene with a 1-olefin which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

9. A method of bonding brass to trans-polybutadiene polymer which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

10. A method of bonding brass to cis-polybutadiene polymer which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

11. A method of bonding brass to high density polyethylene which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

12. A method of bonding brass to high density polypropylene which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

13. A method of bonding brass to a copolymer of ethylene with a 1-olefin which comprises: contacting a strip of said metal to a strip of said polymer while heating to a temperature exceeding the crystalline melting point of said polymer; irradiating the joined strips with high energy radiation for a period of time sufficient to give a total dosage of $1 \times 10^5$ to $1 \times 10^{10}$ roentgens equivalent physical at a temperature ranging above the melting point but not over 500° F.

References Cited in the file of this patent

UNITED STATES PATENTS

| | | |
|---|---|---|
| 2,929,744 | Mathes | Mar. 22, 1960 |
| 2,948,666 | Lawton | Aug. 9, 1960 |

FOREIGN PATENTS

| | | |
|---|---|---|
| 215,019 | Australia | Aug. 23, 1956 |